United States Patent
Achterberg et al.

[11] Patent Number: 6,067,888
[45] Date of Patent: May 30, 2000

[54] SURFACE TREATMENT OF CIRCULAR SAW BLADES

[75] Inventors: Nicholas E. Achterberg, Phoenix, Md.; Mark Addison, Doncaster, United Kingdom

[73] Assignee: Black & Decker Inc., Newark, Del.

[21] Appl. No.: 09/127,319

[22] Filed: Jul. 31, 1998

Related U.S. Application Data

[60] Provisional application No. 08/054,583, Aug. 1, 1997.

[51] Int. Cl.$^7$ ............................. B27B 33/08; B23D 63/00
[52] U.S. Cl. ................................................. 83/835; 76/112
[58] Field of Search .................................. 76/101.1, 112, 76/115, DIG. 1; 83/835, 848; 30/346, 355

[56] References Cited

U.S. PATENT DOCUMENTS

| | | |
|---|---|---|
| 1,919,358 | 5/1933 | Bem . |
| 2,016,092 | 10/1935 | Kavanaugh . |
| 2,073,678 | 3/1937 | Broughton . |
| 2,149,253 | 3/1939 | Cooper . |
| 3,090,166 | 5/1963 | Straub . |
| 3,792,524 | 2/1974 | Pomernacki . |
| 3,799,025 | 3/1974 | Tsunoda . |
| 3,820,419 | 6/1974 | McLagan . |
| 4,054,010 | 10/1977 | Shipman . |
| 4,358,045 | 11/1982 | Jacobsen . |
| 4,674,365 | 6/1987 | Reed . |
| 5,249,485 | 10/1993 | Hayden, Sr. . |
| 5,351,592 | 10/1994 | Bloom ........................................ 83/835 |
| 5,351,595 | 10/1994 | Johnston ..................................... 83/835 |

FOREIGN PATENT DOCUMENTS

| | | |
|---|---|---|
| 0448510 | 3/1991 | European Pat. Off. . |
| 927553 | 11/1947 | France . |
| 288919 | 12/1986 | Japan . |
| 1389950 | 4/1988 | U.S.S.R. ................................... 76/112 |

*Primary Examiner*—Hwei-Slu Payer
*Attorney, Agent, or Firm*—Harness, Dickey & Pierce, P.L.C.

[57] ABSTRACT

A carbide-tipped circular saw blade is formed by brazing cutting tips of tungsten carbide to the teeth of a steel blade blank, thereby creating discoloration on the planar surfaces of the blade adjacent the rim. Substantially the entire surface of the blade is sandblasted with blast media to remove the discoloration while generating a substantially uniform coloration and texture to the planar surfaces of the blade. User-readable graphics are overprinted upon the blasted surface. The graphics and the surface appearance of the blasted area are selected to be at a predetermined contrast, and the carbide cutting tips retain a visual appearance different from the rest of the blade, such that the graphics and cutting tips are visually perceptible to a potential purchaser at the blade's point of sale. The saw blade surfaces are sandblasted by jets directed at both sides of the saw blade. The blast nozzles are oriented such that the vertical components of force of the jets offset one another. This assists in minimizing the blade warping that would otherwise occur due to the sandblasting operation. In all-sandblasted "softbody" blades, a reduction of 20% in deviation from flatness has been achieved compared to similar blades which are polished and rim-blasted.

27 Claims, 3 Drawing Sheets

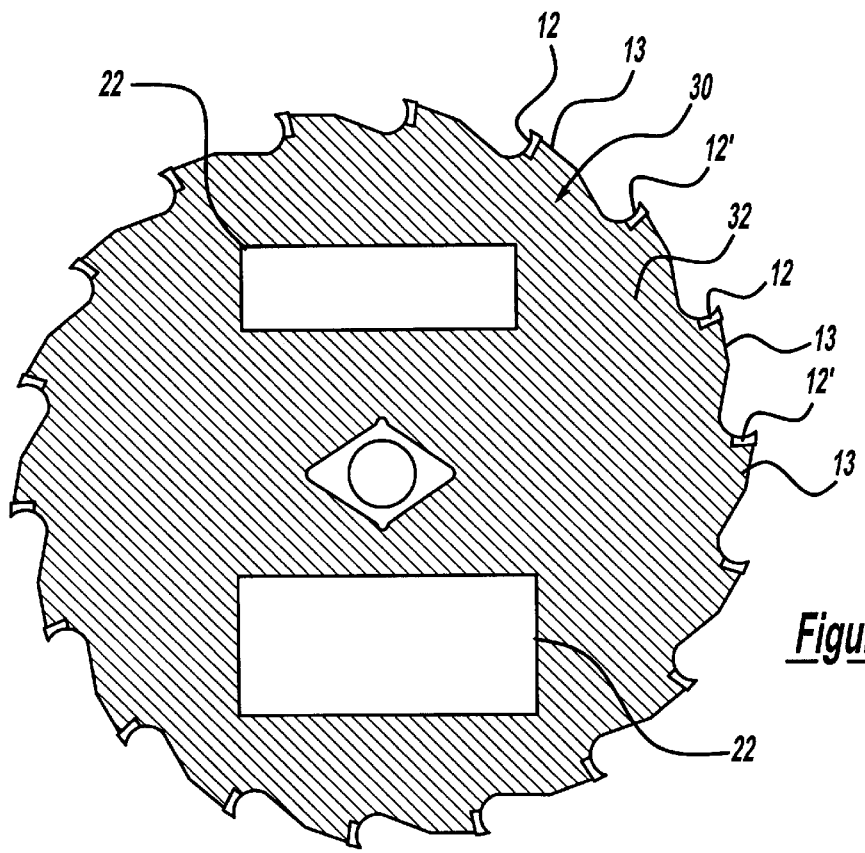
*Figure - 3*
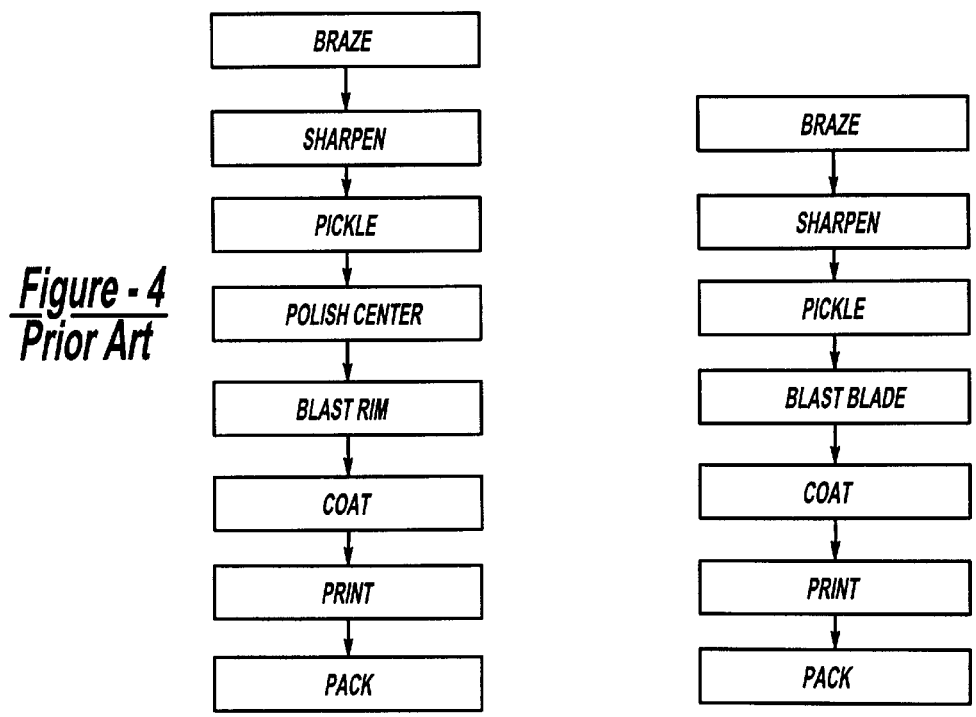
*Figure - 4 Prior Art*
*Figure - 5*

SURFACE TREATMENT OF CIRCULAR SAW BLADES

This application claims benefit of Provisional Application Ser. No. 60/054,583, filed Aug. 1, 1997.

FIELD OF THE INVENTION

This invention relates to a system for uniformly sandblasting substantially the entire exterior surface of a saw blade, particularly a carbide-tipped circular saw blade, such that the deviation in flatness from a perfectly planar blade surface is minimized, and the carbide tips and overprinted blade graphics are readily perceptible by a potential purchaser at the point of sale.

BACKGROUND OF THE INVENTION

It has become a standard of the industry as to carbide-tipped circular saw blades blanked from steel stock, that the blade surface be polished or sanded to look shiny and to display annular "grind lines", characteristics which potential customers at the point of sale have taken to indicate high quality. Thus the visual appearance of a saw blade at retail has become very important. A manufacturing operation which creates an appearance problem is the act of brazing the carbide tips onto the saw blade teeth. This leaves permanent discolorations in the planar surfaces of the blade adjacent the carbide tips, such that the blade could not be sold in that condition. One solution was to paint the entire surface of the blade, including the teeth and tips. The discoloration was covered, but the carbide tips became indistinguishable from the rest of the blade. Now potential purchasers perceived the blade merely to be a cheap, plain steel blade and not worth the prices charged for carbide. As a result, painted carbide blades don't sell well. The next solution was to carefully mask the major part of the blade to preserve its polished look and sand-blast or shot-blast a narrow band around the rim to remove the discolorations. Inasmuch as carbide tips maintain a visual identity after blasting which is separate from that of the blasted metal rim, the tips were readily perceptible by a prospective purchaser at the point of sale, and the blades did sell. The appearance of a shiny blade with a sandblasted rim thus became the standard of the industry and has been the practice for more than 30 years.

Sandblasting circular saw blades causes the blasted surface to "grow", which in turn causes the blade to warp or bend. Accordingly, it was necessary to securely clamp the blade between two big washer-like plates or masks so that only the rim was exposed and the rest of the saw blade remained shiny, and so that the tendency to distort was inhibited. The other arrangement that inhibited distortion was also to blast both the upper and the lower flat rim surfaces simultaneously with opposed nozzles oriented such that the upper and lower blast streams were equal and opposite. The balanced forces acting on the blade rim tended to "grow" both the upper and lower surfaces substantially equally. The blade was also rotated during the blasting operation to achieve a fairly uniform appearance of the narrow blast band.

From time to time, the subject has come up of blasting substantially the entire planar surface area of the blade. It has been regularly dismissed out of hand, for two main reasons. One was the long-held paradigm that unless the blades had the classic polished or ground look, they wouldn't sell. The other was the conviction that under known methods, it simply wasn't technically sound to sandblast the entirety of the blade—it would surely warp. Using the known process was out of the question because the clamping plates covered the blade. An attempt was made at sandblasting without plates, by blasting one side at a time. The attempt failed because sequential blasting also warped the blade. This consequence further reinforced the belief that blades sandblasted over all or substantially all of their planar surfaces simply were not feasible.

SUMMARY OF THE INVENTION

The surface treatment system of the present invention has made it possible to go against conventional thinking and sandblast substantially the entire surface of a carbide-tipped circular saw blade, thereby eliminating the entire sanding/polishing operation of the conventional process, along with its concomitant set-up time, machine-run time, and materials. It also removed the tendency of the belt sander to add to the warping effect as a result of the high heat generated by sanding, even though the sanding operation was relatively brief. Accordingly, it is an object of the present invention to provide a process for making a carbide-tipped circular saw blade in which substantially the entire surface is sandblasted to provide a uniform surface appearance and texture, and in which blade warping is minimized.

It is another object of the present invention to provide a process for making a carbide-tipped circular saw blade in which substantially the entire planar surface of the blade is sandblasted and in which the carbide tips and overprinted graphics are readily perceptible by a potential purchaser at the point of sale. It is further object of the present invention to provide a process for sandblasting the blade, in which the entireties of both the upper and lower flat surfaces are blasted simultaneously, by directing a stream of blast media particles from substantially opposite directions and from opposite sides of the saw blades while rotating the blade. It is still an object of the present invention to mount some of the pairs of jets at angles to the blade such that the vertical components of the streams of blast media emanating from the upper and lower nozzles are substantially opposite and equal. It is yet another object of the present invention to sandblast substantially all of both planar surfaces and the outer cimcumferential edge of the saw blade simultaneously. It is still another object of the present invention to overprint the sandblasted area of the saw blade with graphics, the surface color, texture and appearance of the blade, and the overprinted graphics, being selected to provide suitable contrast such that the graphics can be readily perceived by a potential purchaser at the point of sale.

It is yet a further object of the present invention to mount the blade for sandblasting on a narrow-diameter spindle such that the center of the blade is coaxial with the spindle axis, and to rotate the spindle and blade while directing blast media at substantially the blade's entire planar surfaces.

It is an additional object of the present invention to provide a carbide-tipped circular saw blade in which the surface braze discolorations have been removed, in which the carbide teeth present a visual appearance separate from that presented by the surface of the blade, in which substantially all of the planar surfaces of the blade have been sandblasted, in which deviation from blade flatness is minimized, and in which the surface texture, color and appearance, and the overprinted graphics, have been respectively selected to coact to provide sufficient contrast such that the graphics may be readily perceived by a potential purchaser at the point of sale.

Other objects, advantages and benefits will become apparent by a reading of the rest of the Specification, the Drawings and the appended Claims.

DESCRIPTION OF THE DRAWINGS

FIG. 3 is a plan view of the saw blade of the present invention in which substantially the entire planar surface area of the blade has been blasted, and a portion over-printed with graphics;

FIG. 4 is a block diagram of a portion of a conventional process for manufacturing conventional carbide-tipped circular saw blades;

FIG. 5 is a block diagram of a portion of the process for manufacturing carbide-tipped saw blades of the present invention;

DETAILED DESCRIPTION OF THE PREFERRED EMBODIMENTS

Figure 1:
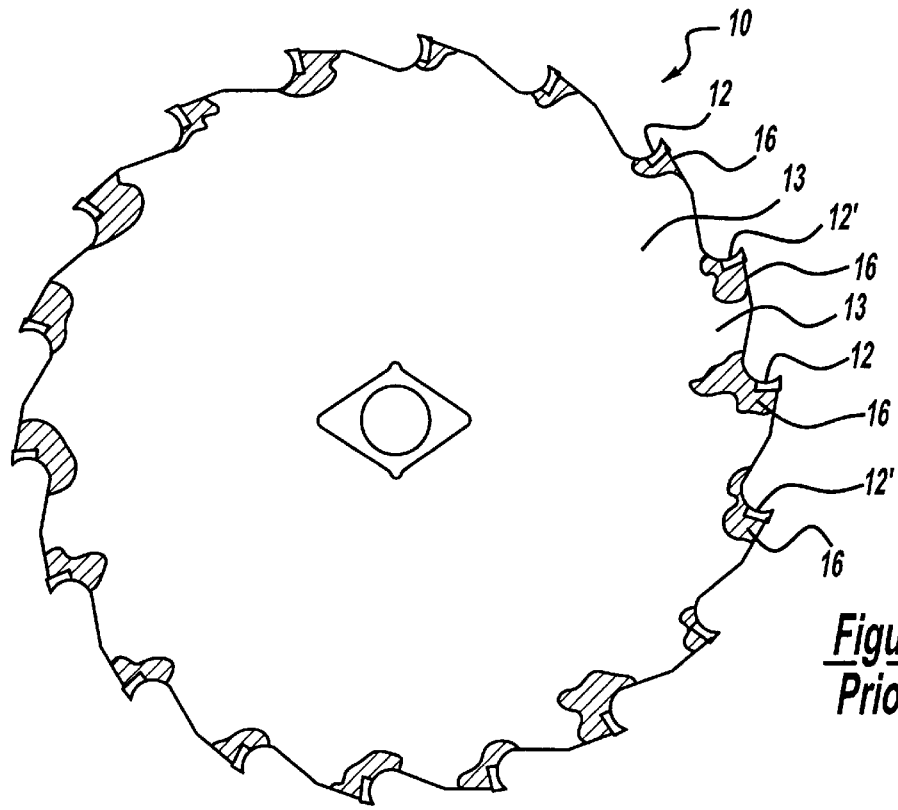
FIG. 1 is a top plan view of the appearance of a conventional circular saw blade following brazing the carbide cutting tips to the circular saw blade, showing the areas of discoloration generated by brazing.
Figure 2:
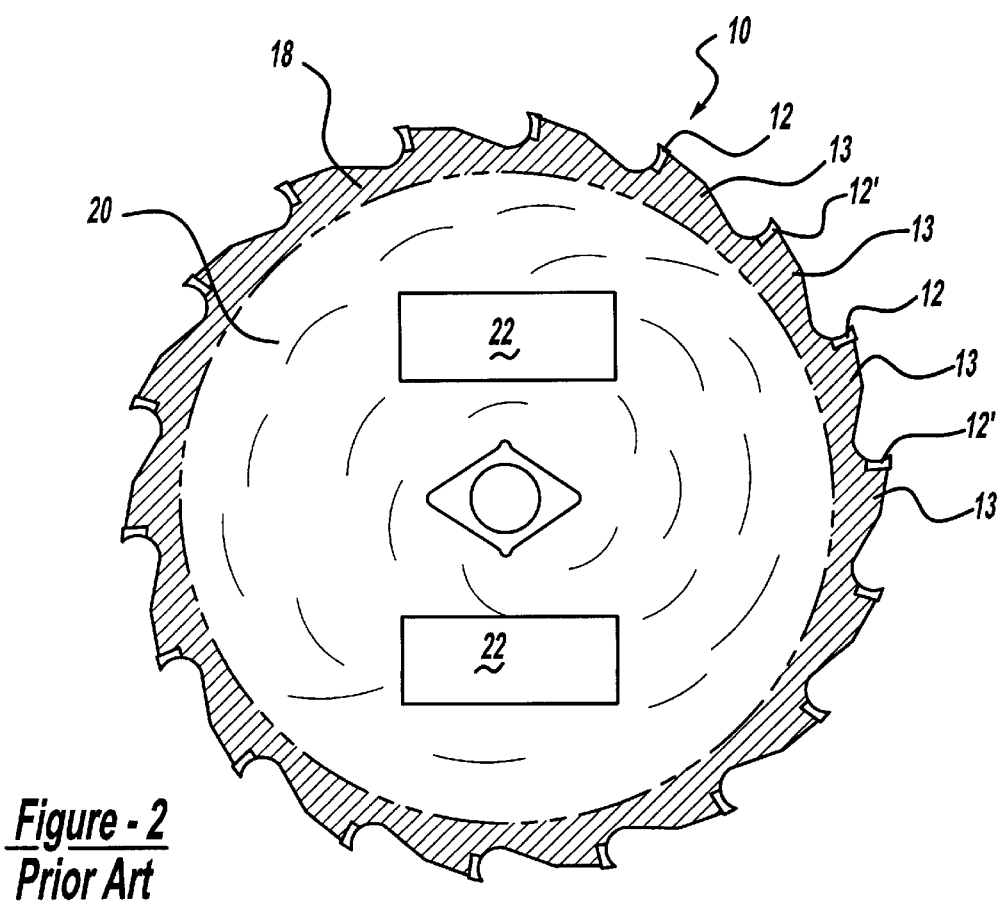
FIG. 2 is a top plan view of the blade of FIG. 1 showing the conventional narrow sandblasted band adjacent the blade rim, and the large polished area on the remainder of the blade.

A conventional carbide-tipped circular saw blade is shown in FIG. 1 generally as 10. At this stage in the manufacturing process, carbide cutting tips 12 have just been brazed to the teeth 13 of a circular saw blade which had earlier been blanked from a plate of steel, and then rolled. The brazing operation has left areas of permanent discoloration 16 adjacent the teeth 13 of the saw blade. A conventional system for dealing with the problem is illustrated in FIG. 2, in which the conventional blade 10 has been shotblasted or sandblasted in a narrow band 18 around the rim. The rest of the surface of the saw blade 20 has been sanded or otherwise polished to a bright finish, on which graphics 22 or other purchaser-observable indicia have been printed, such as the brand of the saw blade (i.e. PIRANHA®, a trademark of The Black & Decker Corporation) and other information. The blasting operation has removed the surface discoloration 16 shown in FIG. 1 and, together with a pickling operation performed after tooth grinding or sharpening, any residual brazing chemicals that may have been present which may otherwise corrode the blade if not removed. The tungsten carbide tips 12, 12', are offset to the right and left sides respectively of the blade 10 to produce a kerf in the workpiece that is slightly wider than the thickness of the blade, so that rubbing and grabbing of the blade is minimized. The offset tips preclude a cost-effective method for removing the discoloration by sanding or by rubbing. Shotblasting or sandblasting a narrow band at the outer periphery of the blade, as shown at 18 in FIG. 2, has therefore become the method of choice.

FIG. 4 is a block diagram of a portion of the process for making the conventional saw blade 10. The saw blade 10 is first blanked from a suitable plate of steel material and then rolled and cleaned. Cutting tips 12, 12' of a harder material than that of the steel plate are then attached to the teeth 13, such as by brazing. As noted above, the cutting tips 12, 12' are typically formed of tungsten carbide; at this point in the process, the blade 10 looks like the saw blade shown in FIG. 1. The tips 12, 12' are then ground or sharpened. The blade 10 is bathed in a pickling solution and the surface 20 is polished. A narrow peripheral band or zone is then sandblasted about the rim, yielding the appearance shown in FIG. 2. The blade 10 is then cleaned and coated with a rust inhibitor (as with lacquer) and overprinted on the polished surface 20 with user-observable graphics 22 having suitable contrast with the surface appearance of the blade. The blade 10 is then packaged for shipment.

FIG. 3 shows a circular saw blade 30 of the present invention, after the blade has been sandblasted over substantially all of its surfaces 32. The graphics or other indicia 22 are overprinted upon the blasted surface 32 such that the graphics and surface appearance of the blasted portion are at a predetermined contrast with one another to provide a readily-perceptible appearance to a potential customer at the point of sale of the blade 30.

FIG. 5 is a block diagram of a portion of the process of the present invention, in which the entire operation of polishing has been eliminated and in which substantially the entire blade 30 is sandblasted. In this respect, in the preferred embodiment of the present invention, "sandblasting" means blasting the new blade 30 with a media 41 comprising aluminum oxide and/or glass beads, or other suitable material like crushed glass or stainless steel balls. Except for the polishing operation, the other elements of the process of the present invention shown in FIG. 5 are substantially the same as those shown in FIG. 4.

Figure 6:
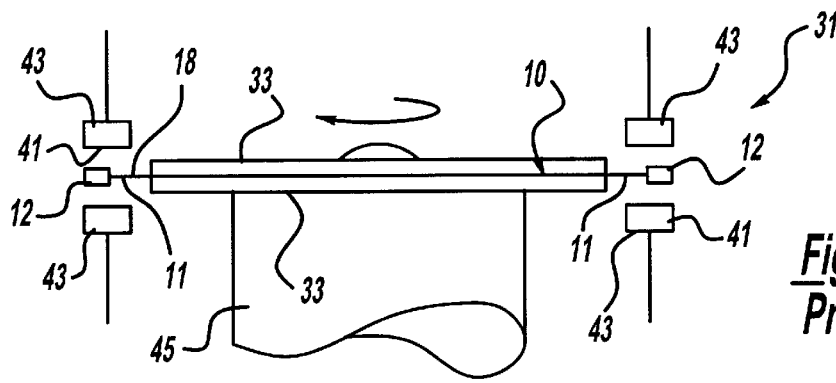
FIG. 6 is an elevational schematic view of a portion of the conventional apparatus for blasting only the saw blade rim of FIG. 2.

A portion of a conventional apparatus for sandblasting solely the blade rim 11 is shown in FIG. 6, generally as 31. The blade 10 is securely clamped by two very substantial plates 33 which mask most of the blade's polished surface, leaving only the rim 11 exposed to the opposed jets of blast media 41 emanating from nozzles 43. The plates 33 are rotated on support member 45, which is one of the ways to help generate a uniform finish to the blade 10. The clamping action of the plates 33 also assists in maintaining "flatness" of the blades to counter the usual warping effect of the sandblasting operation. The warping effect is most pronounced in "softbody" saw blades, namely blades made from relatively soft steel, in the neighborhood of 164–251 Knoop. It is less pronounced in "hardbody" blades, such as blades made from full hard steel (a hardness of about 402–452 Knoop). Inasmuch as it costs less to manufacture softbody blades than hardbody blades, a process which limits the flatness deviation in a softbody blade would be especially valuable. For 7¼" diameter rim-blasted and polished soft-body saw blades (a common size), the maximum deviation from a perfectly planar blade surface is in the neighborhood of about 0.010 inch. (A way of measuring deviation in flatness is to measure the "highest" point of the blade plate from a perfectly planar datum.) This deviation appeared to be the best that could be expected on a consistent basis using the conventional process.

Figure 7:
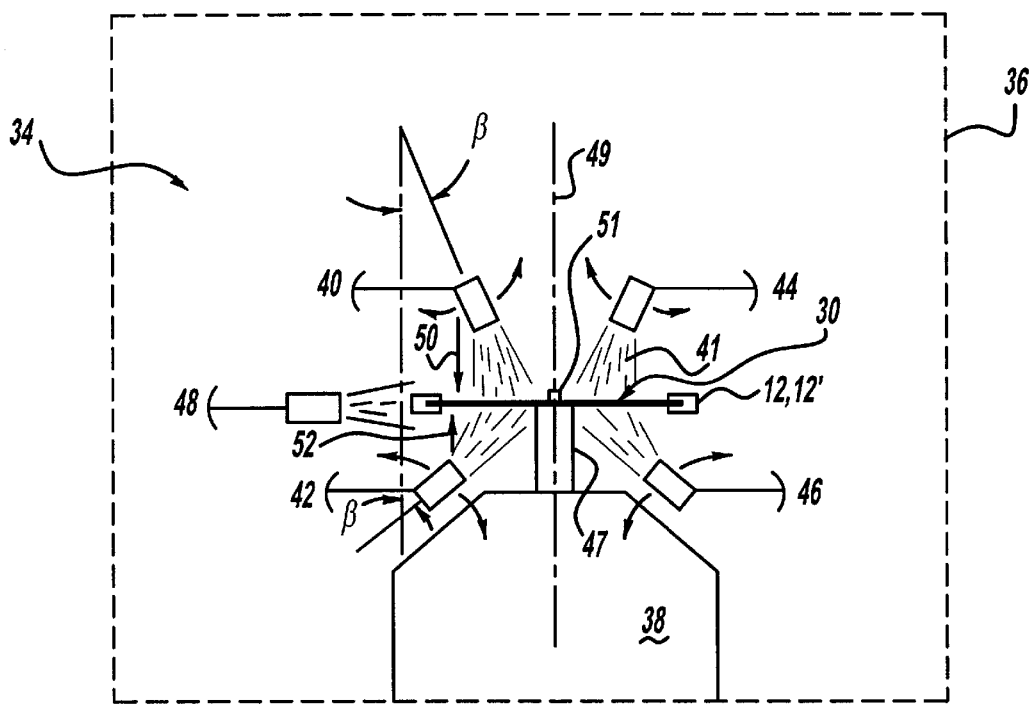
FIG. 7 is an elevational schematic view of the apparatus of the system of the present invention for blasting the new saw blade of FIG. 3.
Figure 8:
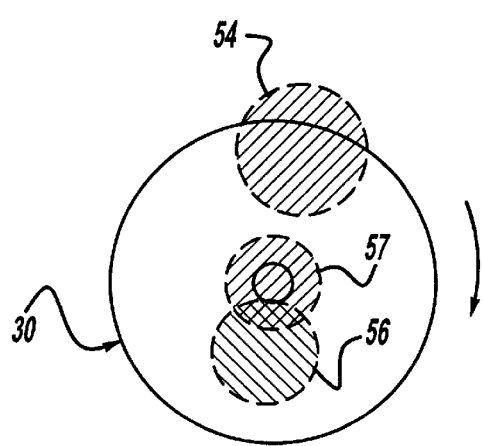
FIG. 8 is a top plan schematic view of the overlapping sandblast zones created by the sandblast apparatus of FIG. 7.

Looking now at FIG. 7, apparatus for sandblasting the blade of the present invention 30 over substantially its entire surface is referred to generally as 34. The apparatus 34 is mounted within a sandblast housing 36. The blade 30 is mounted on a spindle or rod 47 so that its center is coaxial with the spindle's axis 49 and so that it is rotated in a generally horizontal plane by a rotary device 38. A fastener or other small member 51 holds the blade 30 onto the spindle 47 and occludes a very small portion of the blade's surface. This mounting arrangement permits blast nozzles to be directed radially inwardly of the rim 11. With continued reference to FIG. 7, the sandblast apparatus 34 includes a plurality of sandblast nozzles 40, 42, 44, 46, and, if desired, 48. Upper and lower radially-inner blast nozzles 40 and 42, forming a pair, are positioned generally diametrically opposite one another, one each above and below the blade 30. The nozzles 40 and 42 are directed at a predetermined angle, Beta, such that the jets of media 41 are aimed at the radially inner portions 56 and 57 of the blade 30, as shown in FIG. 8, and such that the respective vertical components 50, 52 of the jets of blast media are substantially opposite and equal. This provides a balanced application of forces to the blade 30, maintaining its stability during the process, and ensuring that the deviation from flatness is minimized. Similarly the upper and lower radially-outer blast nozzles 44, 46 are arranged in pairs on opposite sides of the blade 30, as well, such that the vertical components of their respective jets of media are also substantially equal and opposite. These jets produce the region or zone 54 of sandblast, as shown in FIG. 8. Preferably the zones or regions of sandblast 54, 56 and 57 overlap. Also, it is preferable that the sandblast nozzles 40, 42, 44 and 46 be oscillated slightly, for example within one-half inch of deviation, to accommodate variances in the desired orientations of the nozzles. In the preferred embodiment, the blade actually moves through two sandblast stations on a rotary table inside enclosure 36. The sandblast nozzles in the second sandblast station are oriented to fill in any gaps in overlap which may be left in the blade surface after it leaves the first sandblast station. This is yet another method to obtain uniform surface appearance, texture and color (gray in the preferred embodiment). A fifth nozzle 48 may be positioned, if desired, to direct a jet of blast material 41 at the edge surface of the blade 30, as also shown in FIG. 7.

The jets are controlled as to such factors as duration, intensity and quantity of blast media 41 so as to produce a surface coloration and texture which, when graphics or indicia 22 are placed thereon such as by printing, the resulting contrast between the two provides a visually perceptible appearance to the potential purchaser at the point of sale of the blade 30, while keeping the carbide cutting tips 12, 12' visually distinct from the rest of the blasted surface 32. In the preferred embodiment of the system of the present invention, the blasting operation is mechanized and the orientation of the blast nozzles is fixed such that they cannot be adjusted by the operator. This is thought to be essential to accurately balance the blast forces on the blade. Using the system of the present invention, the maximum deviation of all-sandblasted softbody 7¼" blades from perfectly planar blade surfaces is about 0.008", or about a 20% reduction from the typical maximum deviation of rim-blasted and polished softbody blades. The number of blast nozzles used is related to the size of the saw blade. For example, in the preferred embodiment, the number ranges from two upper and two lower nozzles per station for 5½" diameter saw blades, to five upper and five lower nozzles per station for 10" diameter blades.

In the drawings and the specification, there has been set forth preferred embodiments of the invention and, although specific terms are employed, the terms are used in a generic and descriptive sense only and not for purpose of limitation, the scope of the invention being set forth in the following claims.

What is claimed is:

1. A carbide-tipped circular saw blade, comprising:
    a generally planar steel body having a plurality of teeth, a carbide tip being attached to each tooth;
    the blade being blasted over substantially the entirety of its surface, such that the blasted portions of said generally planar body exhibit a uniform visual appearance; and
    predetermined blade graphics applied over a portion of said blasted surface, the graphics and the blade body having uniform visual blasted appearance and a contrast such that the graphics are readily perceptible, and the carbide tips have a separate visual identity, to a prospective purchaser at the blade's point of sale.

2. A carbide-tipped circular saw blade, comprising:
    a plurality of carbide-tipped teeth on the rim of said blade, the blade having a predetermined nominal diameter;
    said blade having two planar surfaces and being formed from a material of predetermined hardness;
    said blade planar surfaces being blasted over substantially their entireties; and
    due to the said blasting, the maximum deviation in flatness of said blasted blade from a perfectly planar surface, being less than the maximum deviation in flatness of a carbide-tipped circular saw blade of the same predetermined diameter and formed from the same material with the same hardness, but which is polished, and blasted solely in a band adjacent the rim.

3. The saw blade claimed in claim 2, wherein the average deviation of the blade being about 20% less than that of the blasted blade blasted solely in a band adjacent the rim.

4. A carbide-tipped circular saw blade, comprising:
    a plurality of carbide tips connected to the teeth of said blade;
    a blade body being formed of steel and having a hardness in the range of from about 164 Knoop to about 251 Knoop;
    said blade being blasted over substantially the entirety of its surface; and
    due to said blasting, the deviation in flatness of said blade from a perfectly planar surface being less than 0.010".

5. The circular saw blade claimed in claim 3, wherein said deviation is 0.008" or less.

6. The saw blade claimed in claim 4, wherein the nominal diameter of the saw blade is 7¼".

7. A process for making a circular saw blade, comprising:
    blanking from steel plate stock, a circular saw blade having two planar surfaces and a plurality of teeth;
    brazing a cutting tip to each of said teeth, the cutting tip being formed of a material harder than said steel plate stock, wherein the brazing operation results in a discoloration of the blade surface adjacent the rim of the blade;
    sharpening said cutting tips;
    blasting substantially at least all of the planar surfaces of the blade with blast media until said discoloration is removed and the blasted planar surfaces of the blade have a visually uniform appearance;
    coating the blasted surfaced with rust protection; and
    applying customer-readable indicia over a portion of the blasted surfaced, said indicia and said visually uniform appearance of said blasted surfaced being selected to be at a predetermined contrast and said cutting tips of said blasted blade retaining a visual identity different from the blasted planar surfaces of the blade, such that the indicia and said cutting tips are visually perceptible to a potential purchaser at the blade's point of sale.

8. The process claimed in claim 7, further comprising bathing the blade in a pickling solution prior to the blasting operation.

9. The process claimed in claim 7, wherein the blasting operation includes blasting both planar surfaces of the blade simultaneously.

10. The process claimed in claim 9, wherein the blasting operation includes:
   orienting the blade between two blast nozzles such that the respective jets of blast media from the nozzles are directed at a blade planar surface in opposite directions so that the blast forces on each planar surface are substantially balanced;
   rotating the blade during blasting; and
   terminating the blasting when the blasted planar surfaces have attained a visually uniform coloration and texture.

11. The process claimed in claim 10, wherein the step of applying indicia includes the step of printing a set of predetermined graphics over a portion of at least one of the blasted planar surfaced of the blade.

12. The process claimed in claim 10, wherein the cutting tips are formed of tungsten carbide.

13. The process claimed in claim 9, wherein the blasting operation includes:
   orienting the blade in a substantially horizontal plane;
   directing jets of blast media at the planar surfaces of the blade from a radially-inner blast nozzle and a radially-outer blast nozzle above the blade, and a radially-inner blast nozzle and a radially-outer blast nozzle below the blade;
   the radially-inner blast nozzles above and below the blade being oriented to one another and the blade planar surfaces, such that the vertical components of their respective jets of blast media are substantially opposite and equal;
   the radially-outer blast nozzles above and below the blade being oriented to one another and the blade planar surfaces such that the vertical components of their respective jets of blast media are also substantially opposite and equal; and
   such that radially-inner and radially-outer blast zones are created on the planar surfaces of the blade by the respective radially-inner and radially-outer blast jets.

14. The process claimed in claim 13, further comprising directing a jet of blast media at the radially-outer circumferential rim of the blade from a blast jet located in substantially the same plane as the blade.

15. The process claimed in claim 13, wherein the blast media is selected from the group consisting of aluminum oxide, glass beads, crushed glass and stainless steel balls.

16. The process claimed in claim 13, wherein the blast media includes a mixture of aluminum oxide and glass beads.

17. The process claimed in claim 7, wherein the blasted planar surfaces are gray-colored.

18. The process claimed in claim 7, wherein, for a 7¼" diameter softbody blade, due to said blasting, the deviation in flatness of the blade from a perfectly planar blade surface after the blasting operation is less than 0.010".

19. The process claimed in claim 18, wherein said deviation is 0.008" or less.

20. The process claimed in claim 7, wherein the rust protection coating is a lacquer.

21. A process for making a carbide-tipped circular saw blade, comprising:
   blanking a softbody circular saw blade having two planar surfaces and a plurality of teeth from plate steel stock;
   attaching a carbide cutting tip to each of the saw blade teeth;
   sharpening the cutting tips;
   blasting substantially the entirety of the saw blade with blast media until the blasted planar surfaces have a visually uniform appearance;
   said blasting providing a deviation in flatness of the blasted planar surfaces from a perfectly planar surface is less than 0.010".

22. The process claimed in claim 21, wherein the deviation in flatness is 0.008" or less.

23. The process claimed in claim 21, further comprising:
   coating the blasted surfaces with rust protection; and
   applying blade graphics over a portion of the blasted planar surfaces, the visual appearance of said blasted planar surfaces, and said graphics, being selected to have a contrast such that said blade graphics are readily perceptible to a potential purchaser at the point of sale of the blade.

24. The process claimed in claim 23, wherein after the blasting operation, said cutting tips have a visual appearance which is distinct from the visual appearance of said blasted planar surfaces, to a potential purchaser at the point of sale of the blade.

25. The process claimed in claim 21, wherein the blasting operation includes:
   rotating the blade planar surfaces between a plurality of pairs of opposed jets of blast media such that, as to each pair of opposed jets, their respective jet components which are perpendicular to the blade's planar surfaces are substantially equal.

26. The process claimed in claim 25, wherein:
   the pairs of jets are set in predetermined orientations relative to the saw blade; and
   the orientations are fixed.

27. The process claimed in claim 26, wherein said orientations are not adjustable by a process operator.

* * * * *

UNITED STATES PATENT AND TRADEMARK OFFICE
CERTIFICATE OF CORRECTION

PATENT NO.    : 6,067,888
DATED         : May 30, 2000
INVENTOR(S)   : Nicholas E. Achterberg et al.

It is certified that error appears in the above-identified patent and that said Letters Patent is hereby corrected as shown below:

<u>Title page,</u>
Item [60], Related U.S. Application Data, "08/054,583" should be
-- 60/054,583 --.

<u>Column 6,</u>
Lines 56, 58 and 59, "surfaced" should be -- surfaces --.

<u>Column 7,</u>
Line 17, "surfaced" should be -- surfaces --.

Signed and Sealed this

Sixth Day of January, 2004

JAMES E. ROGAN
*Director of the United States Patent and Trademark Office*